United States Patent [19]

Sharki

[11] 4,420,391
[45] Dec. 13, 1983

[54] SCREEN TENSIONING ARRANGEMENT

[75] Inventor: Martin J. Sharki, Houston, Tex.

[73] Assignee: Dresser Industries, Inc., Dallas, Tex.

[21] Appl. No.: 310,007

[22] Filed: Oct. 13, 1981

[51] Int. Cl.³ .............................................. B07B 1/49
[52] U.S. Cl. .................................. 209/403; 209/399
[58] Field of Search ................ 209/395, 399, 400, 403

[56] References Cited

U.S. PATENT DOCUMENTS

| | | | |
|---|---|---|---|
| 2,338,523 | 1/1944 | Lincoln | 209/403 |
| 2,804,208 | 8/1957 | Hardfeld et al. . | |
| 2,899,060 | 8/1959 | Schroth | 209/403 |
| 3,186,547 | 6/1965 | Behnke | 209/403 |
| 3,219,065 | 11/1965 | Moeller . | |
| 3,491,881 | 1/1970 | Winquist . | |
| 3,666,095 | 5/1972 | Krynock | 209/403 |
| 4,237,000 | 12/1980 | Read et al. | 209/395 |

*Primary Examiner*—Bernard Nozick
*Attorney, Agent, or Firm*—B. E. Deutsch

[57] ABSTRACT

A vibrating screen used for the fine screening of solids from a slurry containing solids includes a base, a screen box having feed end and discharge end with said screen box being resiliently supported on the base, and a drive for vibrating said screen in a generally longitudinal direction. The screen includes at least two overlying layers of relatively fine mesh screen cloth. A tensioning device is connected to one end of the screen cloth for tensioning the screen cloth in a direction parallel to the direction of motion of the screen cloth.

4 Claims, 6 Drawing Figures

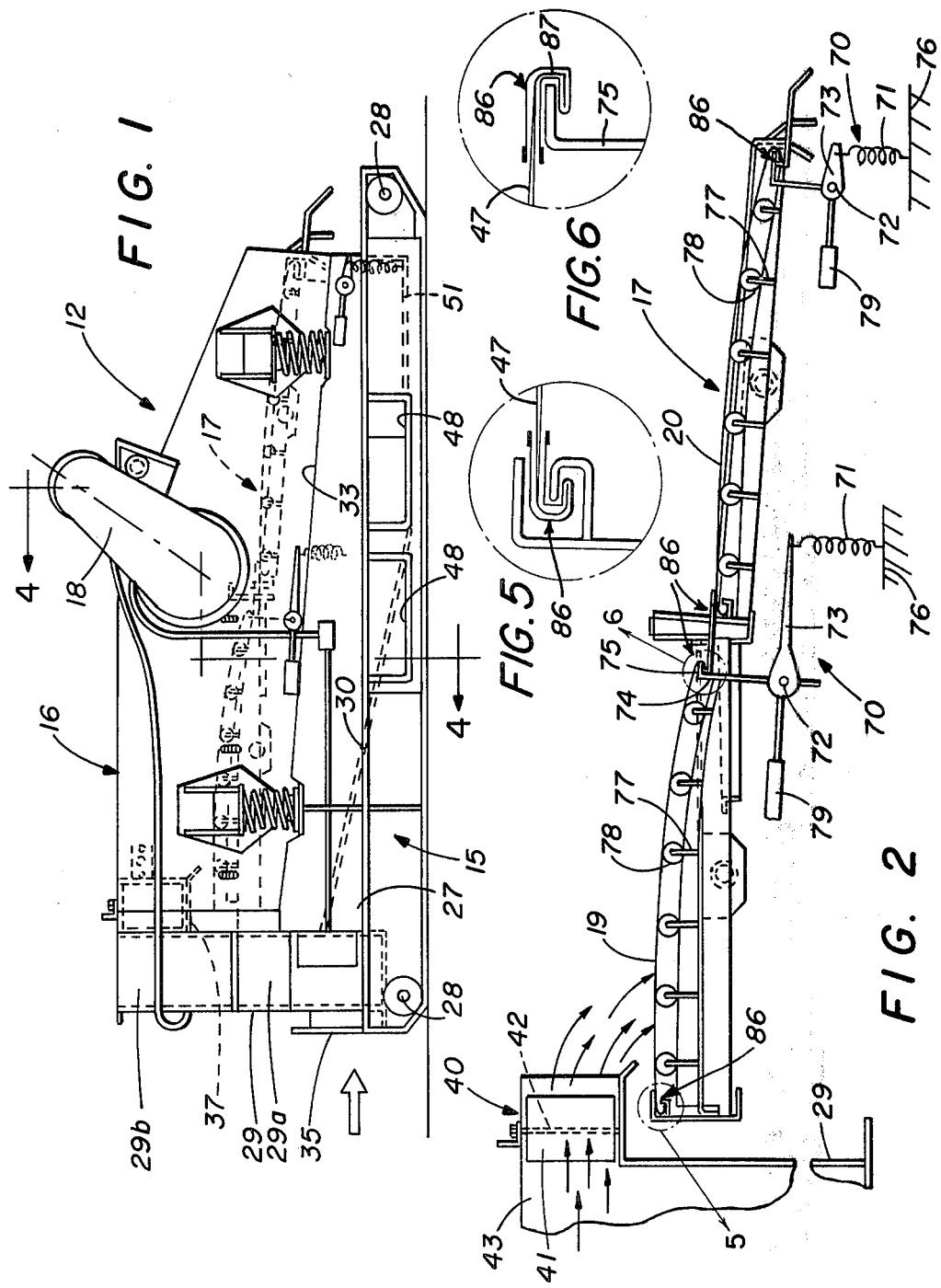

SCREEN TENSIONING ARRANGEMENT

BACKGROUND OF THE INVENTION

The present invention relates to flat deck vibrating screens of the type particularly used for the fine screening of oil well drilling muds, and in particular to a tensioning arrangement for tensioning the relatively fine mesh screen cloth used in the vibrating screen.

It is well known in the rotary drilling of oil wells that it is extremely important to remove drilled solids, i.e., cuttings, cavings, sand, and shale, from the mud used during the drilling operation. Recirculation of the drilled solids can create viscosity and gel problems in the mud, as well as increased wear in the mud pump and mechanical equipment employed during the drilling operation. Solids control thus becomes one of the most important phases of mud control.

A shale shaker or vibrating screen has proven extremely successful in removing drilled solids from the mud. Generally, a fine screen cloth of 60 to 100 mesh is employed with the vibrating screen. The screen generally comprises at least two overlying layers of screen cloth.

The frame of the vibrating screen is resiliently suspended or mounted upon a support and is caused to vibrate by means of a vibrating mechanism, for instance a revolving unbalanced weight carried by a rapidly rotating shaft disposed transversely of the frame. Vibration of the frame caused by the vibrating mechanism results in the fine mesh screen cloth moving in an axial or longitudinal direction with respect to the frame.

Heretofore, the screen cloth has been tensioned in a direction transverse to the path of movement of the screen cloth produced by vibration of the frame. In vibrating screen devices having at least two overlying layers of relatively fine mesh screen cloth, it has been found that such screen cloth wears out at a relatively rapid rate requiring shut down of the device and replacement of the screen cloth. Obviously, due to the importance of the device during the drilling operation, any shut down thereof may prove quite detrimental to the drilling operation. Further, the relatively rapid wear of the screen cloth increases the cost of operating and maintaining the vibrating screen.

SUMMARY OF THE INVENTION

It is therefore an object of this invention to increase the operating life of the relatively fine mesh screen cloth employed on vibrating screen devices.

It is yet another object of this invention to prevent relative movement between the overlying layers of screen cloth employed on a vibrating screen device.

It is still another object of this invention to tension the overlying layers of screen cloth in a direction parallel to the direction of motion of the screen cloth produced by vibrating the screen device.

These and other objects of the present invention are attained in a vibrating screen of the type including a base, a screen box having a feed end and a discharge end, said screen box being resiliently supported on the base, a drive, a rotating eccentric weight connected to the drive and to said screen box with rotation of said weight resulting in vibration of said screen box, and screen means mounted on the screen box. The screen means includes at least two overlying layers of relatively fine mesh screen cloth. Tension means is connected to the screen means for tensioning the screen means in a direction parallel to the direction of motion of said screen means resulting from vibration of said screen box.

BRIEF DESCRIPTION OF THE DRAWINGS

FIG. 1 is a schematic side elevational view of a vibrating screen incorporating the present invention;

FIG. 2 is a longitudinal sectional view taken along line 2—2 of FIG. 3;

FIG. 5 is an enlarged detailed view taken at point 5 of FIG. 2; and

FIG. 6 is an enlarged detailed view taken at point 6 of FIG. 2.

DESCRIPTION OF THE PREFERRED EMBODIMENT

Referring now to the various Figures of the drawings, there is disclosed a preferred embodiment of the present invention as incorporated into the vibratory screen disclosed in U.S. Pat. No. 3,666,095 issued May 30, 1972 in the name of Robert A. Kryrock and Robert W. Ruhe, Jr. Reference may be had to this patent for a more detailed description of the vibrating screen described herein.

Figure 3:
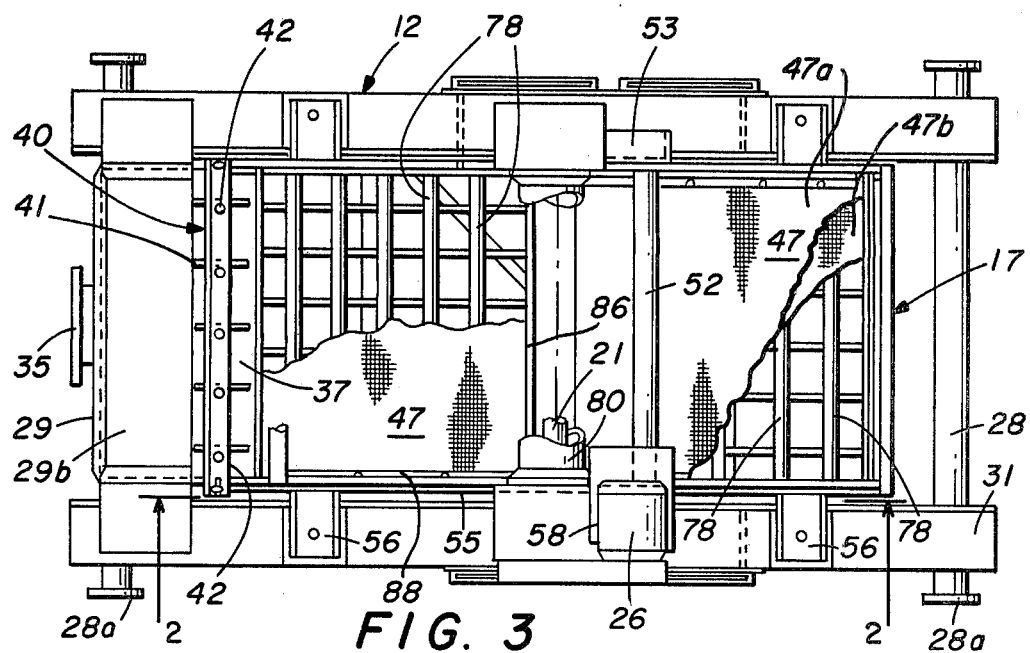
FIG. 3 is a schematic plan view of the screen shown in FIG. 1, with parts broken away.
Figure 4:
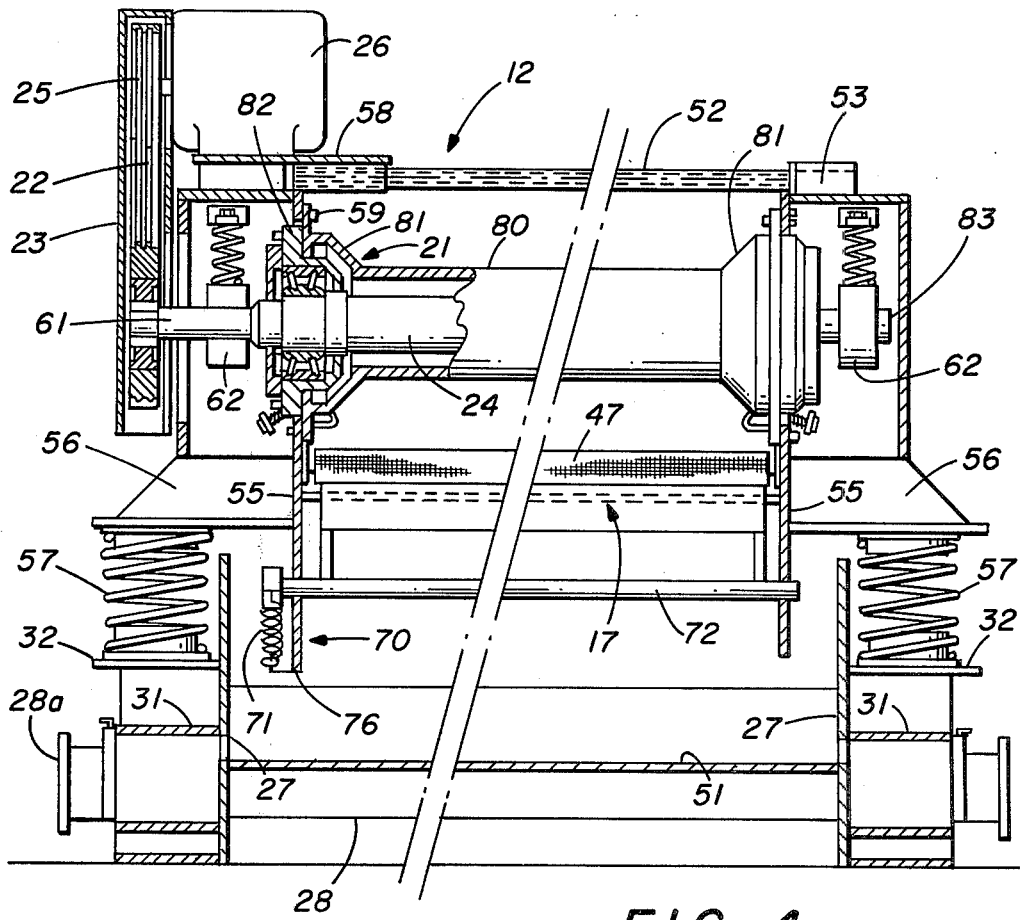
FIG. 4 is a schematic transverse sectional view taken along line IV—IV of FIG. 1.

In the embodiment of the invention illustrated in the various Figures, vibrating screen 12 is used for the fine screening of oil well drilling mud and similar slurries. Screen 12 is a portable, self-contained unit, having a combined tank and base 15, screen box 16, screen deck 17 and drive 18. Combined tank and base 15 is essentially "L" shaped in its side elevation, as shown in FIG. 1. As illustrated in FIG. 3, the screen is substantially rectangular in its plan view. Deck 17 is made up of two sections, feed-end section 19 and discharge-end section 20. Screen box 16 is spring supported on base 15 and carries screen deck 17 and vibrator assembly 21. As illustrated in FIG. 4, drive 18 comprises a V-belt 22 connecting pulley 23 to one end of vibrator shaft 24 and pulley 25 attached to electric motor 26 mounted on the top of box 16.

The tank and base 15 is composed of two vertical side plates 27, two transverse tubes 28, feed-box 29 and collecting tank 30. Each side plate 27 is a reinforced weldment having horizontal stiffners 31 and two reinforced spring support brackets 32. Upper edge 33 of the side plate is sloped downwardly from the feed-end to the discharge to conform generally to the average slope of screen deck 17. Two tubes 28 act as transverse structural ties between side plate 27 at each end of the base near the bottom of the side plates. The tubes extend outwardly beyond the side plates and horizontal stiffners to permit a hoisting sling to be used over each tube end 28a.

At the feed-end of the screen, feed box 29 is attached to side plates 27 just above one of the transverse tubes 28 and comprises lower portion 29a and upper portion 29b. The lower portion is triangular in transverse cross-section and is arranged to receive material from inlet pipe 35 and direct same upwardly to the generally rectangular portion 29b which communicates with flume 37.

Adjustable feed vanes 40 are provided in feed flume 37. Each vane 40 comprises a pivoted vertical plate 41 attached to threaded rod 42. The plates are approximately as wide as the spacing between the threaded rods and as high as sides 43 of flume 37. When set perpendicular to the flow, the vanes can prevent flow, but when opened they present a wide surface to control the direction of flow.

Collecting tank 30 is integrally formed in base 15 to provide a watertight hopper for collecting undersize material and water flowing through screen 47 supported on screen deck 17 in a manner to bbe more fully explained hereinafter. As shown in FIG. 3, screen 47 comprises at least two overlying layers of mesh screen cloth including upper cloth 47a and lower cloth 47b. The overlying layers of cloth include longitudinally disposed edges 88 (see FIG. 3) and transversely disposed ends 87 (see FIG. 6). In the lower, central portion of each side plate 27, discharge openings 48 are provided for withdrawing the undersize material. A formed bottom plate 51 sloping from the feed-end to discharge openings 48 and flanged vertically at the discharge end, is welded to side plates 27 to provide for the collection of the undersize material and water and to permit it to flow to discharge openings 48.

Screen box 16 comprises essentially two vertical side plates 55 which are approximately trapezoidal in outline. Spring support brackets 56 are welded to each side plate at predetermined locations. Coil springs 57 are located between screen box brackets 56 and base brackets 32 to provide for isolation of vibrating screen box 16 from base 15. Screen deck 17 is bolted to side plates 55 to tie them together transversely into a rigid structure. Motor support plate 58 is fastened to the top of one side plate 55 slightly forwardly of its longitudinal center line. Horizontal transverse tube 52 connects motor support plate 58 to counter weight 53 mounted on the opposite plate. Counter weight 53 balances the weight of the drive on the screen box to obtain more uniform motion.

As illustrated in FIG. 4, vibrator assembly 21 is bolted to each side plate 55 with fasteners 59. Drive extension 61 of vibrator shaft 24 extends beyond counter weight assembly 62 on the same side of the screen box as the motor support plate 58. Screen box 16 with screen deck 17, drive 18, vibrator assembly 21 and screen means 47 all move as a unit with a vibrating motion produced by vibrator 21.

Screen deck 17 comprises generally horizontal feed section 19 followed by discharge section 20 downwardly inclined at 5° in the direction of flow. Vibrator assembly 21 as illustrated in FIG. 4 comprises tubular housing 80, with flanged end bell section 81 on each of its ends, which is bolted to screen box side plates 55. Within each end bell 81 there is a flanged cartridge type sealed spherical roller bearing block 82. The bearing blocks support vibrator shaft 24 which has a concentric extension 83 on each of its ends beyond the bearing box for mounting counter weight assemblies 62. End 61 of the vibrator shaft is further extended to carry V belt pulley 23 for drive 18.

As mentioned previously, screen 47 generally comprises at least two overlying layers of fine mesh screen cloth 47a and 47b. As illustrated in FIGS. 5 and 6, the transverse ends 87 of the cloth are secured in place by clamp 86. Heretofore, the screen cloth has been tensioned in a direction transverse to the path of movement of the screen cloth produced by vibration of the frame. Vibration of the frame is caused by operation of vibrator assembly 21. Such vibration results in the fine mesh screen cloth moving in a generally axial or longitudinal direction with respect to side plates 55. It has been found the vibratory motion results in the screen cloth wearing at a relatively rapid rate. It has recently been recognized that the cause for such rapid deterioration of the screen cloth can be attributed to relative movement between the two overlying layers of cloth. The lower layer of screen cloth 47b is generally coarse, whereas the top layer 47a is generally fine. Therefore, the lower layer is heavier than the upper layer of cloth. Support members 78 provide a support surface for the cloth and is generally covered with rubber. The lower, heavier layer of cloth becomes embedded in the rubber, resulting in the upper, lighter cloth moving relative thereto. The relative movement between the overlying layers of screen cloth is in a direction parallel to the direction of movement of the cloth resulting from operation of the vibrating mechanism. Any soild material caught between the overlying layers of cloth rapidly abrades the layers due to the relative motion therebetween.

To overcome the foregoing problem, the present invention provides an arrangement for tensioning the overlying layers of screen cloth in a direction parallel to the direction of motion of said screen resulting from operation of vibrator assembly 21. By tensioning the layers of screen cloth as described herein, the relative motion between the overlying layers will be eliminated. Thus, even if solid material becomes sandwiched between the overlying layers, the absence of relative motion therebetween will prevent the captured solid material from rapidly abrading the screen cloth.

Tensioning arrangement 70 includes support rod 72 extending between side plates 55 of screen box 16. A longitudinally extending member 73 is pivotally attached to rod 72. A spring 71 is connected at one end to an end of member 73 and at its other end to bracket 76 which in turn is connected to the bottom of side plate 55. Tensioning member 74 extends vertically upward from shaft 72 and includes a flange 75 to which the ends of the overlying layers of screen cloth are attached via clamp 86. Spring member 71 provides a force for urging tensioning member 74 in a clockwise direction as illustrated specifically in FIG. 2. If it is necessary to change the screen cloth, handle 79 attached to member 73 is forced downwardly to urge members 73 and 74 in a counter-clockwise direction to relieve the tensioning force and relax the screen cloth. By tensioning the overlying layers of screen cloth in a direction parallel to the direction of movement of the screen cloth, relative movement therebetween is eliminated. Thus, any solid material caught between the overlying layers of cloth will not abrade the cloth as rapidly as has heretofore occurred with the prior art arrangements.

As seen specifically in FIG. 2, screen 47 is supported in a longitudinal direction via transversely extending bars 77 having generally "U" shaped support members 78 attached at the top thereof to directly support the undersurface of screen 47. The support members are generally made from or covered with rubber or other suitable material. Support bars 77 located at the feed end of screen deck 17 progressively decrease in height to provide a bowed or cambered support surface for screen 47. Support bars 77 disposed under screen 47 of discharge section 20 progressively decrease in height relative to the 5° downward incline in the direction of flow to also provide a bowed or cambered support surface for overlying screen 47. The bowed or cambered support surface provided by members 77 and 78 enable screen 47 to be tensioned and not have any uneven pockets or ripples when placed on deck 17.

The present invention provides a relatively inexpensive change in the basic design of vibrating screens while providing a mechanism for significantly improving the operating performance and decreasing the maintenance of such screen devices.

While a preferred embodiment of the present invention has been described and illustrated, the invention should not be limited thereto but may be otherwise embodied within the scope of the following claims.

The embodiments of the invention in which an exclusive property or privilege is claimed are defined as follows:

1. In a vibrating screen of the type including a base, a screen box resiliently supported on the base and having a feed end and a discharge end longitudinally spaced from the feed end, screen means removably secured to said screen box and extending longitudinally, drive means including a rotating eccentric weight vibrator attached to said screen box for vibrating said screen means in a generally longitudinal direction, said vibrating screen means been used for fine screening of solids from a slurry containing solids, the improvement which comprises:

said screen means including at least two overlying layers of relatively fine mesh screen cloth; and tension means connected to the ends of said overlying layers of screen cloth for tensioning said overlying layers of screen cloth in a longitudinal direction parallel to the direction of motion of said screen whereby relative longitudinal motion between said overlying layers of screen cloth is substantially eliminated.

2. The invention of claim 1 wherein said tension means includes a movable tensioning member connected to one end of said overlying layers of screen cloth for selectively tensioning and relaxing said cloth.

3. The invention in accordance with claim 2 wherein said tension means further includes force generating means connected to said movable tensioning member for urging said tensioning member towards a first position for tensioning said overlying layers of screen cloth.

4. The invention in accordance with claims 1 or 3 further including longitudinally spaced curved support means extending transversely beneath the surface of said screen for defining a longitudinally bowed support surface for said screen.

* * * * *